(No Model.)

C. N. HOMAN.
FENDER FOR ELECTRIC CARS, &c.

No. 508,472. Patented Nov. 14, 1893.

UNITED STATES PATENT OFFICE.

CALEB N. HOMAN, OF LAWRENCE, MASSACHUSETTS.

FENDER FOR ELECTRIC CARS, &c.

SPECIFICATION forming part of Letters Patent No. 508,472, dated November 14, 1893.

Application filed January 9, 1893. Serial No. 457,720. (No model.)

*To all whom it may concern:*

Be it known that I, CALEB N. HOMAN, a citizen of the United States, residing at Lawrence, in the county of Essex and State of Massachusetts, have invented certain new and useful Improvements in Fenders or Safety Attachments for Electric or other Cars, of which the following, taken in connection with the accompanying drawings, is a specification.

The object of my invention is to produce a fender or safety attachment for electric or other cars whereby danger of serious injury to persons or other objects that may be on the track and come into contact with the car will be prevented.

The invention consists of a series of plates arranged in front of the car each plate being carried by two or more coil springs the outer ends of which are secured to an angular bar, whereby each plate can yield independently of the other as hereinafter fully described and pointed out in the claims.

Figure 1:
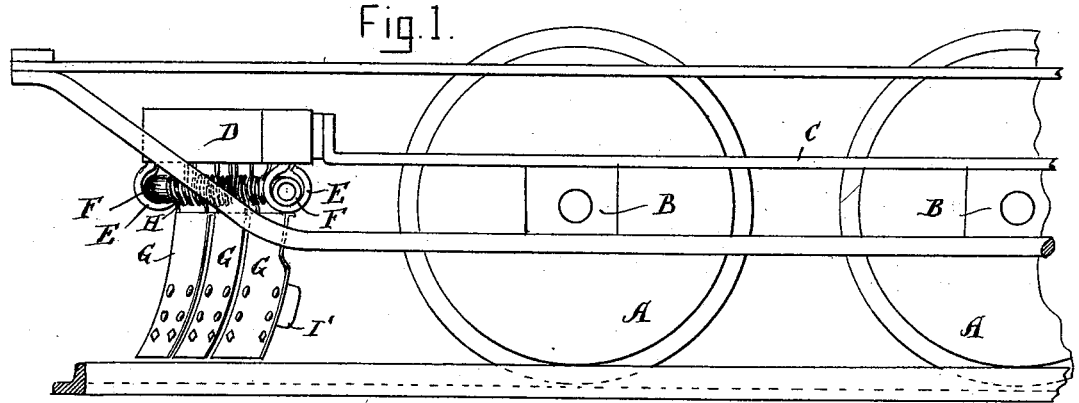
Figure 2:
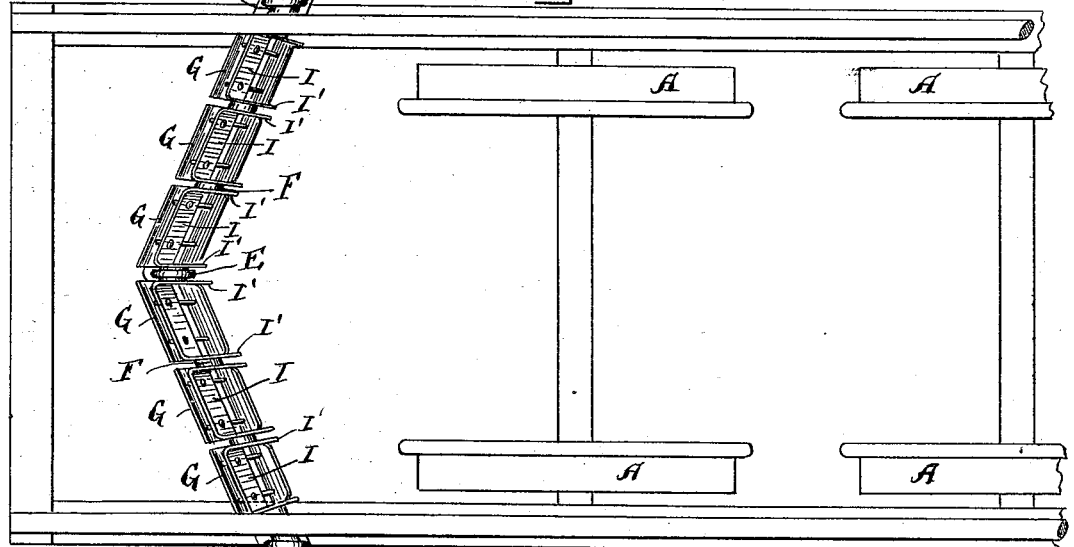
Figure 3:
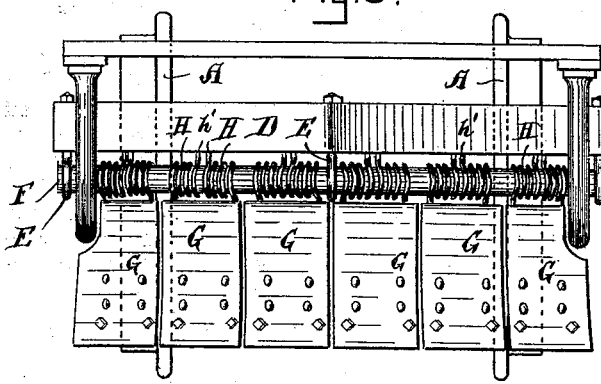
Figures 4, 5:
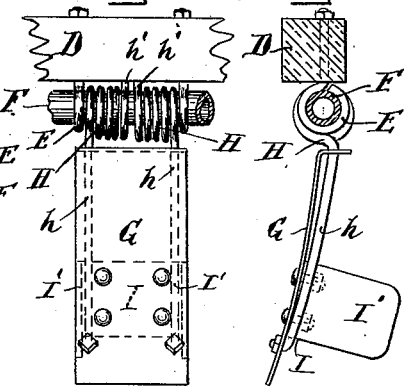

Referring to the accompanying drawings: Figure 1— represents a side view of a portion of the frame of a car with my invention applied thereto. Fig. 2— is a plan view of same looking from the under side of the car. Fig. 3— is a front view. Figs. 4 and 5— are respectively a front view and end view of one section or plate embodying my invention drawn to a somewhat larger scale.

A, A, represent the car wheels, B, the boxes or journals of same to which is secured a rod or bar C, the ends of which are bent at right angles and have secured thereto an angular bar D. To the under side of this bar are secured eyes or bearings E, in which is mounted an annular tube, rod or bar F.

G, are plates preferably curved with their lower ends projecting outwardly. These plates are secured to the extension $h$, of one end of coiled springs H, two coiled springs being employed for each plate. The other ends $h'$, of said springs are secured in the angular bar D.

To the rear of each of the plates G, is secured a plate I, having rear projections or wings I', the object of which is to prevent one plate G, overlapping another should one of said plates be forced back by itself.

It will be seen that by this construction a series of plates carried by springs are set at an angle in front of the car wheels which will first come into contact with any object on the track, and should said object be rigid the springs will yield and allow the plates to pass over same, but should the object be a human body or any other object that will yield to pressure then the plates G, will push such object forward, and should the car continue its passage sufficiently far, said object will be forced to one side of the track clear of the wheels of the car thus preventing said wheels from running over or injuring said person or object.

What I claim is—

1. In a car fender a series of plates arranged in front of the car each plate being carried by two or more coil springs the outer ends of which are secured to an angular bar whereby each plate can yield independently of the others.

2. A bar F, around which springs are coiled one end of each of which is secured to a bar D, and the outer end carrying plates G, as and for the purpose set forth.

3. An angular bar D, secured to the bars C, carrying the bearings of the wheels A, of the car, coiled springs H, having one end secured to said bar D, and the other or outer ends carrying plates G, substantially as and for the purpose set forth.

In testimony whereof I have signed my name to this specification, in the presence of two subscribing witnesses, on this 4th day of November, A. D. 1892.

CALEB N. HOMAN.

Witnesses:
J. E. HANLY,
EDWIN PLANTA.